(12) United States Patent
McAlister (10) Patent No.: US 6,503,584 B1
(45) Date of Patent: Jan. 7, 2003

(54) COMPACT FLUID STORAGE SYSTEM

(76) Inventor: Roy E. McAlister, 1739 W 7th Ave., Mesa, AZ (US) 85202-1906

( * ) Notice: Subject to any disclaimer, the term of this patent is extended or adjusted under 35 U.S.C. 154(b) by 0 days.

(21) Appl. No.: 09/370,431

(22) Filed: Aug. 9, 1999

Related U.S. Application Data (63) Continuation-in-part of application No. 08/921,134, filed on Aug. 29, 1997, now Pat. No. 6,015,065.

(51) Int. Cl.$^7$ ................ B29D 22/00; B29D 23/00; B32B 1/08; F17C 1/00; F17C 11/00
(52) U.S. Cl. ................ 428/34.1; 220/560.04; 220/560.08; 62/46.1
(58) Field of Search ................ 220/586, 506, 220/560.08, 590, 560.04, 577, 581, 582, 584, 588, 589, 592; 428/34.1, 34.6, 36.9, 36.92, 457; 62/607, 48.1, 48.2, 611, 46.1

(56) References Cited

U.S. PATENT DOCUMENTS

| | | | | |
|---|---|---|---|---|
| 3,404,061 A | * | 10/1968 | Shade et al. | 161/125 |
| 3,967,256 A | * | 6/1976 | Galatis | 340/242 |
| 4,077,788 A | * | 3/1978 | Woollam | 149/1 |
| 4,094,762 A | * | 6/1978 | Clelland | 204/192 |
| 6,015,065 A | * | 1/2000 | McAlister | 220/586 |

FOREIGN PATENT DOCUMENTS

| | | | |
|---|---|---|---|
| EP | 0 025 858 A1 | * 4/1981 | C01B/3/00 |

OTHER PUBLICATIONS

Donnet J.B., Carbon Black, Marcel Dekker, New York, 1976, pp. 16–18.*
Steinberg M., The Hy–C process (thermal decomposition of natural gas) potentially the lowest cost source of hydrogen with the least carbon dioxide emission, BNL, 61364, Brookhaven National Laboratory, Upton, NY, Dec. 1994.*
Dash J.C., Two–Dimensional Matter. Scientific American, May 1973, pp. 30–40.*

* cited by examiner

*Primary Examiner*—Harold Pyon
*Assistant Examiner*—Michael C. Miggins (57) ABSTRACT

A densification and storage system for fluids is provided by multitudes of closely spaced parallel planes of adsorptive material (88) that is contained within a substantially impervious barrier layer (2). In normal pressure-containing embodiments, reinforcement (4) is wrapped upon the impervious barrier layer (2) to increase the burst strength of the assembly that results. In higher pressure containing embodiments, material (88) provides reinforcement of barrier layer (2).

20 Claims, 3 Drawing Sheets

COMPACT FLUID STORAGE SYSTEM

This application is a continuation in part of App. Ser. No. 08/921,134, filed Aug. 29, 1997 now U.S. Pat. No. 6,015,065.

This invention concerns the storage of fluids such as gases and volatile liquids in compact containers. Gases such as hydrogen, methane, oxygen, nitrogen, and helium present difficult storage problems. They must be cooled to very low temperatures to be stored as cryogens at atmospheric pressure. Storage of desired quantities of such gases for novelty, commercial, and transportation applications at ambient temperature requires very high pressures.

Previous improvements in compact gas storage include the storage of acetylene in acetone and the storage of natural gas on activated carbons. Attempts to extend the surface area per gram of material include Fullerines, Fullerides, Fulleroids, carbon nanotubes, carbon whiskers, and carbonized: aerogels, foams, and natural fibers such as spider webs, etc. These examples fall short of the ability to practically store natural gas and hydrogen at densities capable of competing with liquid-state storage. Storage in: nanotubes, It crystalline whiskers, and within pores of particles pose the common problem of limited material efficiency because of the surface-to-volume characteristics, extremely limited heat transfer to and from such structures, and because these substrate geometries do not facilitate multiple-layer storage between expansive parallel surfaces.

The present invention overcomes the difficult storage problems of many potentially plentiful but relatively under-utilized gases such as hydrogen, natural gas, and landfill gas. Objects and Advantages of the Present Inventions Include:

1. Provision of compact storage and retrieval system for gases such as hydrogen, methane, oxygen, nitrogen, and helium.
2. Provision of a low-cost method of manufacturing high-yield gas storage systems.
3. Provision of a system for controlling the rate of heat addition to endothermic releases of adsorbed gases.
4. Provision of optimized separation dimensions within extremely high surface-to-weight gas adsorption systems.
5. Provision of a system for enhancing heat removal during exothermic adsorption of gases.
6. Provision of a radially and axially reinforced, high strength fluid storage system capable of safely storing fluids at very high storage-pressure to system-weight ratios.
7. Provision of thin films of adsorbed liquids on extended surfaces to enhance adsorption capacities of certain gases.
8. Provision of ways to improve over the limitations of gas storage in micro-pores, scrolls, whiskers, spherical crystals, Buckey balls, and miniature tube structures.
9. Provision of multiple-molecular-layer fluid storage between expansive parallel surfaces.
10. Provision of controlled heat removal during exothermic adsorption of fluids on an integrated storage system.
11. Provision of controlled heat addition during endothermic desorption of fluids from an integrated storage system.
12. It is an object of the invention to utilize electric charge control to increase storage capacity and to facilitate release of fluids stored on surfaces and in capillary systems.
13. It is an object of the invention to utilize substantially parallel planes of high thermal conductivity material to provide efficient heat transfer to and from activated carbon, nanostructures, and miniature tubes located between layers of such planes.
14. It is an object of the invention to utilize electric charge control to facilitate exfoliation of substrates utilized for storage of fluids.
15. It is an object of the present invention to provide systems for cooking, heating, pure water generation, and electricity production that are inexpensive, highly portable and weight saving.

Other objects and advantages will become apparent from the following specification and discussion of the drawings.

Figure 1:
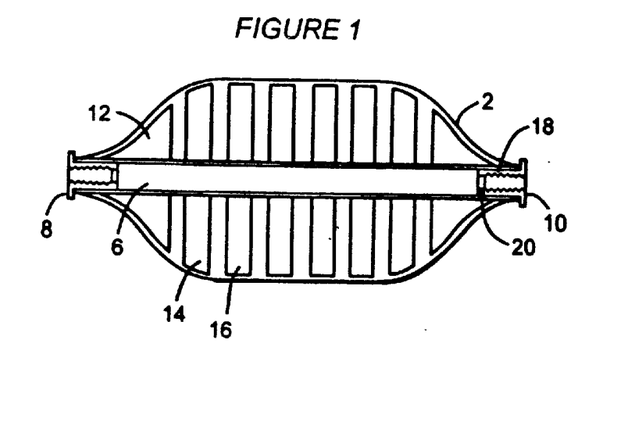
FIG. 1 is a longitudinal sectional view of a device constructed in accordance with the principles of the present invention.
Figure 2:
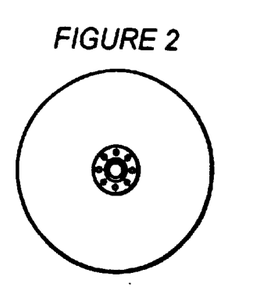
FIG. 2 is a sectional end view of an embodiment of the invention.
Figure 3:
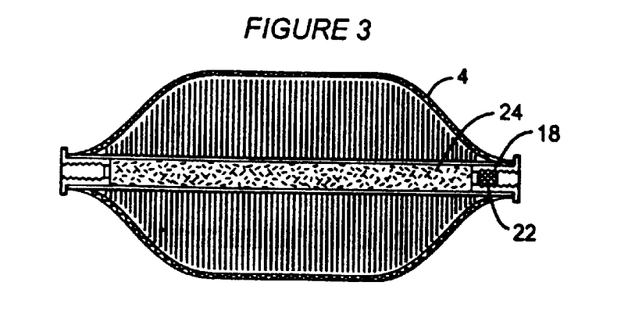
FIG. 3 is a longitudinal sectional view of an embodiment of the present invention.
Figure 4:
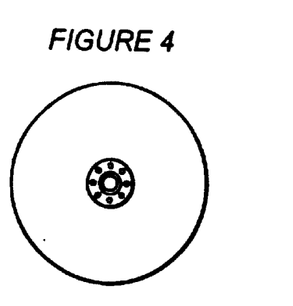
FIG. 4 is a sectional end view of the embodiment of FIG. 2.

DESCRIPTION OF THE PREFERRED EMBODIMENT:

FIG. 1 illustrates a cross-section of a compact storage system. Impermeable pressure vessel liner 2 is preferably manufactured as a thin walled vessel which is supported by higher strength filament windings 4 as shown in FIG. 3. Suitable vessel liners include those manufactured from a variety of materials including steel, aluminum, titanium, glass, and plastics. Vessel 2 is preferably fitted with suitable connections 8 and 10 at both ends as shown.

Tube 6 is porous, slotted, or made of wire cloth and has the function of supporting crystals of graphite such as 12, 14, and 16. It is preferred to use single crystals or stacks of crystals of the same crystalline orientation of cleavable materials such as graphite or hexagonal boron nitride. A particularly useful orientation of the hexagonal single crystals is with the closely packed 0001 planes substantially perpendicular to tube 6.

Single crystals 12, 14, and 16 may be deposited as pyrolylic graphite upon a suitable substrate that provides the desired shape as shown. Materials suitable as molds for depositing pyrolylic graphite ("PG") in the shapes shown are boron nitride ("BN"), tungsten carbide ("WC"), titanium carbide ("TiC"), boron carbide ("BC"), and refractory metals. It is also possible to machine single crystals of BN or PG to the desired shapes from larger blanks.

Single crystals of desired shapes are bored to allow free insertion of support tube 6. Liner 2 may be a deep-drawn two piece assembly, a spin formed part, or a longitudinally seamed assembly. Liner 2 is assembled over the single crystals and welded or joined to fittings 8 and 10 as shown.

Several methods have been found suitable for preparing separated layers of crystalline materials such as graphite including impregnation with substances such as sulfuric acid and nitric acid either individually or as a mixture, mixtures of nitric acid and potassium clorate, halogens, silver, aluminum, manganese, active metals, iron, zinc, ammonia, pyradines, and keytones. Active- metal impregnates may contribute electrons to the graphite crystals. Non-metallic ions and atoms may be provided with electrons from the aromatic carbon crystals. These chemical bonds define the impregnate's resulting electron configuration, location, and crystal-layer spacing characteristics. Contributing electrons to the carbon crystals strengthens the crystals. Thus, basal planes are separated and strengthened by chemical bonds with impregnants in the space between said planes.

In another approach, the assembly is placed in suitable tooling anvils (not shown) that support the outside surface of liner 2. Heated hydrogen is then admitted through fitting 8 and the assembled single crystals are warm soaked in a fluid such as hydrogen until a uniform concentration of hydrogen has diffused into each crystal. In order to achieve suitable entry of hydrogen into the graphite crystals it has been found to be particularly advantageous to coat the graphite crystals with materials that perform catalytic roles including production of atomic hydrogen from diatomic hydrogen and diffusion of the atomic hydrogen into solution within the graphite.

Coatings sufficient for this purpose include the platinum metal group, rare earths, palladium-silver alloys, titanium, and alloys of iron-titanium, iron-titanium-copper, and iron-titanium-copper-rare earths. It is sufficient to apply very thin coatings of such materials by vapor deposition, sputtering, or electroplating techniques. After the coatings have served the purpose of entering hydrogen into solution within the graphite it is preferred to remove the coating materials for reuse.

Sudden pressure release causes the hydrogen impregnate to move into areas of least dense packing and to form gaseous layers. Hydrogen gas pressure causes the exfoliation of each 0001 plane. Additional separation can be accomplished by repeating the exfoliation cycle with successively larger molecules such as methane, ethane, propane, and butane. By controlling the amount of hydrogen that enters the crystals, the temperature at the start of expansion, and the physical limits of crystal growth, separation of the 0001 planes can be achieved. Regardless of which approach is utilized for separation of the parallel layers it is preferred to adhere or suitably lock the layers to membrane 2 or to stake the separated layers to conduit 6 soon after the spacing operation.

Separation distances are chosen to allow storage of two or more layers of storage gas. Illustratively, separation of 12 A to 15 A (angstroms) allows methane to form two dense monolayers of each face of adjacent planes of exfoliated media. Additional low pressure storage of gas that is more or less arrested if not actually adsorbed is provided by the resulting geometry. Capillary states result when the spaces between the 0001 planes are about 15 A or larger and the spaces between adsorbed monolayers are filled with molecules that transfer kinetic energy to the 0001 planes and tend to occupy about the same molecular volumes as adsorbed gases, liquids, or solids. In the instance of storing gases like hydrogen and methane it has been found advantageous to first plate the exposed carbon surfaces with a lower vapor pressure substance such as butane or propane.

It has also been found advantageous to store mixtures of hydrocarbons such as methane and hydrogen for the purpose of producing greater energy storage densities than either gas stored separately. It is envisioned that this advantage results from more efficient volumetric packing density in multiple layers of molecules that assume more or less crystalline arrangements in the spaces between expansive parallel layers of graphite crystals.

During exfoliation, the precursor crystals 12, 14, 16 grow in the direction perpendicular to the 0001 planes to fill the space available. It is preferred to use several crystals spaced as shown in FIG. 1. This provides uniform separation distances. It has been found helpful to excite the crystals in many ways including application of energy such as inductive heating, radiative heating, and ultrasonic energy to hasten hydrogen diffusion into the crystals and at the time of pressure release to improve exfoliation uniformity.

Another approach to, separation of laminate or parallel graphene layers is to diffuse hydrogen into a host crystal of graphite followed by elevation of the temperature sufficiently to cause reaction of the hydrogen with carbon atoms that are most susceptible to reaction. Highly probable reactions are with carbon in, higher free energy states between the most perfect planes of 0001 orientation. The reaction shown below provides clean-up of mislocated and other high free energy carbon atoms and improves the order of the resulting storage matrix.

$$C+4H \rightarrow CH_4$$

Homogeneous distribution of hydrogen followed by rapid heating to form methane between 0001 layers causes generation of internal pressure in the desired locations for exfoliation as the methane molecules expand to occupy much larger volumes than the interstitial hydrogen and solid carbon atoms. This provides an embodiment that is particularly suited for high volume production from substrates ranging from powder compacts to pyrographite deposited from gas phase.

Hydrogen readily emulates an alkali metal or a halogen to donate an electron or to accept an electron depending upon the polarity of the applied electropotential field. Another approach to exfoliation and to dense storage of fluids is to control the r electric charge on parallel plates such as the basal planes of graphite. Adding or removing electrons provides arrestment of hydrogen in adsorptive storage mechanisms. Illustratively, adding electrons to the basal planes assists in separation of such planes by development of like-charge repulsive forces. After exfoliation, removing electrons from the basal planes while fluids are being stored increases storage density. Increasing the magnitude of the applied voltage for, electron removal increases the storage density of fluids such as hydrogen and hydrogenous materials such as paraffinic gases, and ammonia.

It is envisioned that this is because the removal of electrons tends to create attraction between the basal plane atoms and the atoms of the fluids being stored. Reversing the polarity of the applied voltage to add electrons to the basal planes releases fluids from storage. Similar results can be produced by storage of hydrogen as an emulated halogen and releasing it as electrons are-extracted. This allows a close control of the occasion and rate of stored fluid releases.

It is preferred to provide electrical conduction paths to the exfoliated basal planes for such electro-storage operations by plating the edges of exfoliated basal planes with a conductive membrane made. from substances such as precious metals, aluminum, nickel, or conductive epoxy or conductive ink. This conductive membrane is then insulated with a suitable dielectric such as a fluoropolymer or thermoset polymer to provide a high resistance barrier to electron transfer except where an electrical contact is provided.

Where high electrical resistance coupled with high thermal conductivity is needed, it is preferred to use beryllium oxide, diamond, glassey carbon, or boron nitride as the isolation dielectric. Further layers of composite material may be added to provide the degree of impact, thermal transfer control, and pressure containment strength desired.

After exfoliation to desired separation distances, the freshly prepared adsorption media is arrested to prevent further shuffling in the axial locations of the 0001 layers. Several suitable methods may be utilized including:

1. Injecting a thermoplastic resin through fitting 10 to produce as molded interference or "staking" fit. Thermoplastic polymer molecules usually are many times larger than the optimal spacing between 0001 layers. Suitable thermoplastics include polyolefins, fluoroolefins, polyesters, and vinyls. It is preferred to use tube 6 as an equiaxed-flow distributor of the staking resin. Injected thermoplastic first fills tube 6 and then uniformly passes radially under hydrostatic pressure to stake the exfoliated planes in place.
2. Injecting a thermosetting mixture such as an epoxy resin. This technique has the advantage of producing less stress on the staked planes than using injection molded thermoplastic.
3. Substituting an expandable mechanical collet for tube 6. Suitable materials include thermoplastics, aluminum, magnesium, and copper alloys.
4. Using a self-rising foam 24 such as polyurethane or a reaction-injection-molded foam to create a radial loading against the properly spaced planes.

Fitting 8 may be of any suitable configuration including designs with internal or external straight or tapered threads, quick-coupling types, o-ring sealed fittings, and flange-gasket systems. The functions of fitting 8 are to provide a high strength port through which escaping gases such as hydrogen can quickly exit during the exfoliation process and to provide access for placement of the exfoliated sheet staking compound. After placement of the staking compound and sealing the chamber, fitting 8 my be utilized as one tie point to mount the tank as desired.

Fitting 10 may be of any suitable configuration including designs similar to fitting 8. One function of fitting 10 is to provide flow to and from the space within tank liner 2. Holes 18 allow flow to and from the space within the tank. Further functions of fitting 10 are to provide a high strength port through which escaping hydrogen can quickly exit during exfoliation; to provide for plugging off tube 6 beyond the adsorption media after exfoliation; and to provide flow to and from the storage media after the staking operation.

FIG. 3 shows a cross-section -of the exfoliated crystals which have been staked by a suitable compound. Port 8 is plugged and port 10 has been fitted with filter body 22. Plug 20 maybe of any suitable design including a set screw, a wire cloth form, a crushed gauze, or a sintered metal filter 22 that prevents passage of staking materials but which allows filtration of gases passing into and out of tank 4 through holes 18.

The novel aspects of shaped single crystal preforms and the arrestment of exfoliated layers as illustrated with respect to the embodiment of FIG. 3, allow the development of efficient gas storage in virtually any container shape. Long thin tubes are envisioned for stream-lined applications such as torpedo propulsion fuel storage. Spherical tanks are also envisioned for least-weight fuel storage systems.

Figure 5:
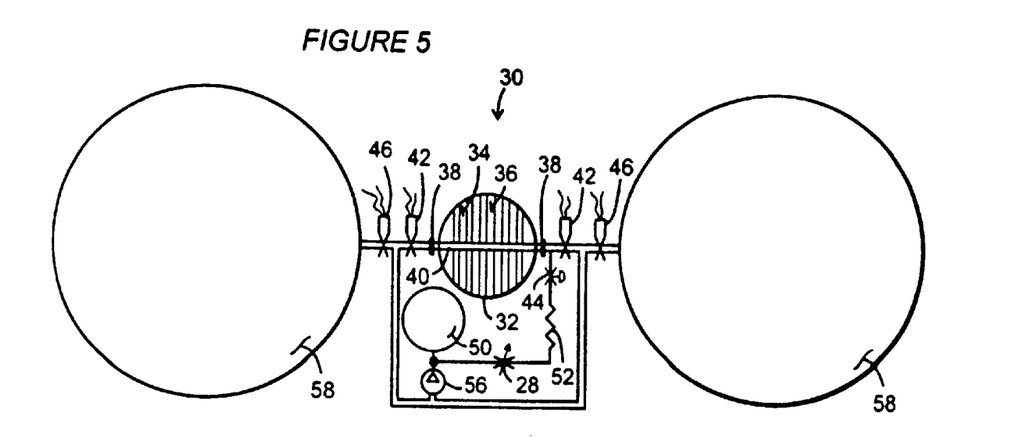
FIG. 5 is a schematic of an embodiment of the invention.

FIG. 5 schematically illustrates a system for exfoliating adsorption _media by using impregnating substances. Adsorption tank 30 is prepared as described above with exterior tank 32, shaped crystals 34, 36, etc., fittings 38 and perforated tube 40. Pressurized fluid such as hydrogen is delivered from accumulator 50 to pressure regulator 28 and then to heat exchanger 52. Heated hydrogen is then passed through valve 44. into tank 32 to charge the single crystals. Tank 32 may be heated by any suitable means including the use of heated anvils that conform to the surface of tank 32. After a sufficient time the hydrogen is diffused throughout the single crystals.

Pressurization of tank 32 at pressures higher than the normal operating pressure is contemplated in instances that conformal anvil tooling is utilized to limit strain on tank 32. It is also contemplated that heated conformal anvil tooling would be used for stress,relieving tank 32 before and after the exfoliation process.

While developing desired concentrations of hydrogen in the single crystals, valve 44 is closed. Valves 46 are opened and vacuum tanks 58 are evacuated by pumping system 56. Hydrogen evacuated from tank(s) 58 is transferred through pumping system 56 and is stored in accumulator 50.

Exfoliation is accomplished by rapidly opening solenoid valves 42 and allowing hydrogen in the single crystals to migrate to low packing efficiency areas where gaseous layers form and expand. Hydrogen escapes to tanks 58 leaving exfoliated layers of two dimensional crystals.

Following exfoliation to suitable spacing between the densely packed 0001 layoru, tank assembly 30 is heated to bake-out hydrogen. Depending upon the materials of construction and the choice of adsorption media, the vacuum bake-out temperature may be from 120° C. to 1,600° C. After bake-out the tank is cooled to ambient temperature and back filled to ambient pressure, preferably with the gas or fluid which will be stored.

Tank assembly 30 is then disconnected from the exfoliation circuit at fittings 38, filter strainer 22 is inserted, as shown in FIG. 3, and the staking compound is injected through tube 40 to retain the exfoliated layers. In instances that the selected staking compound produces gaseous by-products it is preferred to provide a tooling vent through fitting 38 for preventing contamination of the exfoliated surfaces by the gases from the staking compound.

Pyrolytic graphite ("PG") has a density of about 2.26 grams per centimeter. It can be grown to desired shapes or machined to desired shapes. By complete exfoliation, a cubic centimeter of PG can produce about 9,680 square meters of new surfaces:

ATOMS PER CUBIC CENTIMETER $$\frac{(2.26 \text{ grams})}{\text{cm}^3} \frac{6.02 \times 10^{23} \text{ atoms}}{\frac{12 \text{ grams}}{\text{mole}}} = 1.13 \times 10^{23} \frac{\text{atoms}}{\text{cm}^3}$$

ATOMS PER EDGE OF CUBIC CENTIMETER $$\sqrt[3]{1.13 \times 10^{23}} = 48,399,539 \text{ atoms on each edge of a cubic centimeter}$$

AREA OF PARALLEL PLANES PER CUBIC CENTIMETER $$1 \text{ cm}^2 \frac{(48,399,539 \text{ layers})}{10,000 \text{ cm}^2/\text{m}^2} \frac{(2 \text{ surfaces})}{\text{layer}} = 9,679.9 \text{ m}^2/\text{cm}^3$$

SURFACES DEVELOPED PER GRAM $$\frac{(99679.9 \text{ m}^2)}{\text{cm}^3} \frac{(\text{cm}^3)}{2.26 \text{ gm}} = 4,283 \text{ m}^2/\text{gram of graphite.}$$

It will be appreciated that such large surface area expanses are of magnitudes much greater than the true surface areas presented by activated carbons or by Fullerines, nanotubes, and scrolled whiskers which have defining walls of one atom. The actual surface area per $cm^3$ varies with the separation distance between parallel planes and is customized for each type of gas storage that is designed. The apparent area may be much higher than the actual surface area because of capillary action that results in fluid layering to produce many additional planes of arrested fluid between exfoliated planes of host crystal. In addition to preparation of such maximized surface areas it is very useful to exfoliate every other plane, every third parallel plane, every forth plane and so forth to customize the density, specific heat, thermal conductivity, structural and other properties needed for specific applications. By controlling the concentration of the exfolating agent such as charge, hydrogen, or a metal, or halogen such as fluorine to be only enough to produce an average exfoliation of 50% or 33.3% or 25% etc., customized properties result.

Control of the concentration of exfoliation agent, heat addition, and stress distribution in the substrate provide particular customizations of manufactured crystals. Heat input by radiation, inductive generation of eddy currents in the substrate planes, and resistive heating with current substantially perpendicular to the parallel planes while the substrate is held in compression prior to allowing the exfoliate to separate the parallel planes illustrate some combinations for various customization purposes. A pyrolytic graphite crystal subjected to eddy current heating in each layer allows control of the separation gaps that result by accentuating the chemical and physical activities of the exfoliation agent.

Inductive heating with control of the frequency, current level, and rate of travel along the crystal in conjunction with the times of introduction and amount of exfoliate provides customization of the manufactured crystal. Eddy current induced by an inductive heater that travels at rates varying from slow to very fast from one end of the crystal to the other provides additional degrees of control over customized properties that are produced.

Fullerines, nanotubes, and scrolled whiskers have one-atom-thick walls but fail to present the needed large-area expanse of parallel surfaces of one-atom-thick walls that the present invention provides for storage of multiple layers of fluid molecules between multitudes of such crystalline walls. The present invention has much greater capacity for storage of fluids such as gases and liquids in multiple molecular layer condensed states.

Equally important to the formation of large surface areas per gram is the preparation of large expanses of parallel surfaces of material with high thermal conductivity for purposes of removing heat on fluid adsorption and adding heat to facilitate fluid removal. The present invention accomplishes these purposes far better than previous approaches to multilayer storage of fluids and for desired operational heat transfers. This combination enables alternative fuels such as hydrogen and landfill methane to be stored as multiple motion-arrested layers between expansive parallel one-atom thick walls at energy densities approaching that of gasoline.

Figure 6:
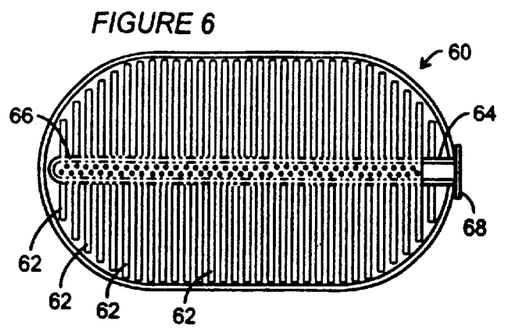
FIG. 6 is a longitudinal sectional view of a device constructed in accordance with the principles of the present invention.
Figure 7:
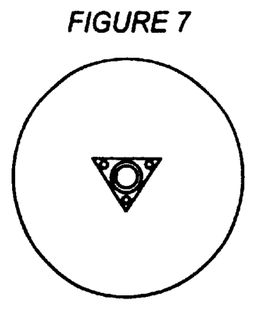
FIG. 7 is a sectional end view of the embodiment of the invention shown in FIG. 6.
Figure 8:
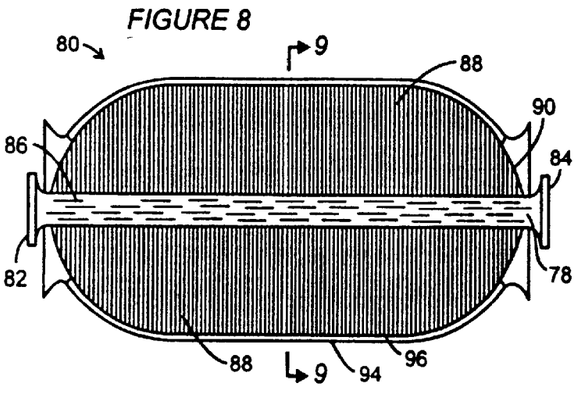
FIG. 8 is a longitudinal sectional view of a device constructed in accordance with the principles of the present invention.
Figure 10:
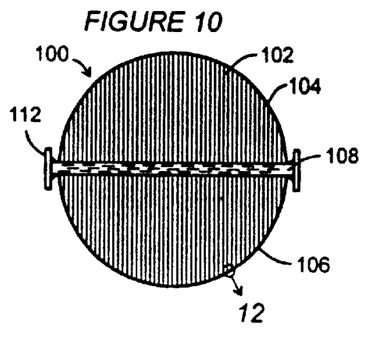
FIG. 10 is a sectional view of a device illustrating the principles of the present invention.
Figure 11:
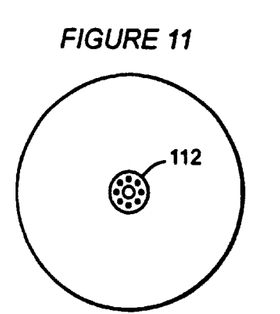
FIG. 11 is an end view of the embodiment of FIG. 10.

Incorporating various high surface-to-volume materials between high conductivity basal planes provides synergistic results. A difficult problem with nano-tubes, nano-scrolls, fullerines, and Buckeyballs is heat transfer to and from such structures as needed to load and unload adsorptively stored fluids. Incorporating such miniature structures between multitudes of high-conductivity parallel planes such as will be shown at 62, 88, or 102 provides desired spacing of such planes and provides much improved thermal conduction to and from such microstructures during fluid loading and unloading procedures.

Incorporation of microstructures between parallel planes of highly conductive material provides orders of magnitude improvement in thermal conductivity to and from such microstructures and control of fluid loading and unloading procedures while strengthening the overall crystal matrix.

Another embodiment of the invention is shown in FIG. 6. As shown in the cross-section of FIG. 6, foil strips or tapes 62 of graphitic composition are wound in a helical spiral around a central mandril 64. Materials suitable for the spiral coils 62 include graphite fabrics in plain or satin weaves such as those provided by Hercules Incorporated P.O. Box 98, Magna, Utah 84044, and "grafoil" ribbon from Union Carbide Corporation, Old Ridgebury Rd, Danbury, Conn. 06817.

Mandril 64 may be a solid wire or bar stock of aluminum, steel, titanium, or magnesium alloy. In the embodiment shown, however, mandril 64 is a perforated tube and thus serves as a support for graphite spirals 62 and as a gas inlet and outlet manifold. Perforations or holes 66 allow free circulation of gases into and out of graphite spirals 62. Fitting 68 provides flow to and from the tank assembly.

Spiral(s) 62 are loosely wound from controlled lengths of graphite foils or tape in order to form best fits for given tank geometries as shown. Spiral(s) are preferably wound with sufficient spacing between each layer to provide room for expansion upon exfoliation.

Exfoliation is accomplished as detailed with respect to the construction of the embodiment of FIG. 1. The assembled tank is loaded with exfoliation gas, hot aged to expedite diffusion of hydrogen or other suitable gases such as helium throughout the crystals of the spiral media, and vacuum shocked to cause exfoliation of each crystal.

Because of the multi-crystalline nature of the graphite in spirals 62, the exfoliated media that results grows in varying amounts in all directions. Orientations from the original tape or foil preparation and of the exfoliated spirals within tank 60, provide for greatest exfoliation growth in directions perpendicular to the length axis of the foil. Woven graphite yarns provide growth perpendicular to the axis of the yarn fibers.

A particularly significant embodiment of the strip and fiber type of exfoliated storage media is absorption of sonic and vibrational energy to generate local heating of the substrates that host storage of fluids. Illustratively, in such applications the storage media can be an acoustic dampener of unwanted noise and vibration while providing energy conversion for desired releases of stored fluids for purposes such as forming a pressure source, or depending upon the type of fluid in storage, provide a fuel supply, an oxidant supply, or an inert gas supply. The invention is particularly useful in quieting difficult noise A sources such as a kinematic engine or some other machinery with relative-motion components.

The combination of heat engine, fuel supply, and noise suppression provides a greatly simplified and lighter weight system than pervious approaches for the same results. In addition to providing release of stored fluids by noise absorption it is often convenient to attach an ultrasonic driver such as a piezoelectric driver to the storage vessel to provide this function. This type of stored fluid release is especially beneficial in instances where waste heat is not available from other sources and when it is not desired to generate heat or to incur a thermal signature. Sonic release can be used in combination with electric charge control and with heat transfer to produce the type of release rates desired under a wide variety of application conditions.

Figure 13:
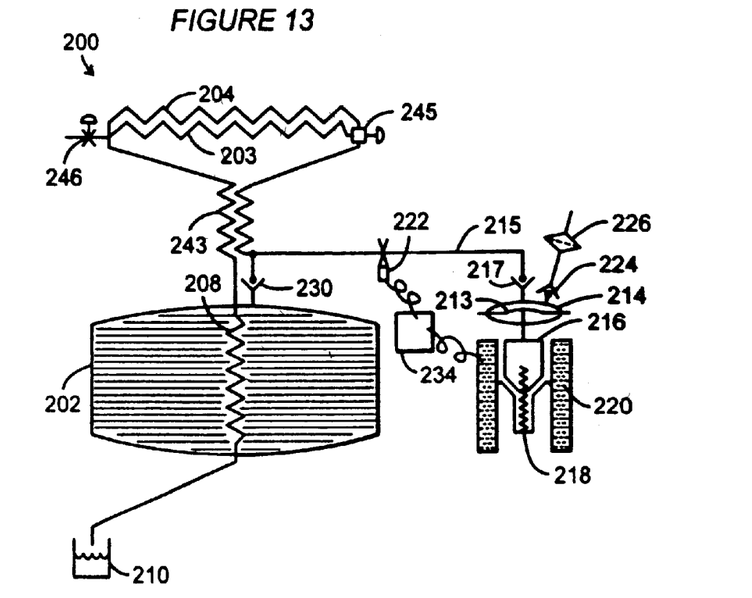
FIG. 13 is a schematic view of an embodiment for cooking and production of purified water.

FIG. 13 shows the basic embodiment 200 for cooking, heating, and production of purified water. A fluid such as hydrogen or a "Hy-Boost" formula mixture of hydrogen and a hydrocarbon or hydrogenous fluid such as ammonia is stored in reservoir 202 which is constructed in accordance with the principles of the invention. Fluid fuels are released by heating of the storage crystals in 202 by heat transfer from vapors from catalytic combustion in "burner" tubes 204. Such vapors travel first through counter heat exchanger 243 which has a primary circuit that delivers fluids to 245 from 230 and a secondary circuit that delivers fluids from 204 and/or 203 to 208. Counter current heat exchanger 243 provides heat exchange from the secondary circuit to the primary circuit where heat for endothermic and/or catalyst induced reactions such as the following are performed:

$$CH_4 + H_2O + HEAT \rightarrow CO + 3H_2 \qquad \text{Equation 1}$$

$$2NH_3 \rightarrow N_2 + 3H_2 \qquad \text{Equation 2}$$

After further cooling by heat transfer into the contents of 202 through heat exchanger 208 and considerable condensation of the water vapor, liquid water is collected in reservoir 210. As shown in Equations 3 and 4, one pound of hydrogen can produce about nine pounds of water upon condensation.

$$H_2 + 0.5O_2 \rightarrow H_2O + HEAT \qquad \text{Equation 3}$$

$$1 \text{ lb } H_2 + 8 \text{ lbs } O_2 \rightarrow 9 \text{ lbs } H_2O \qquad \text{Equation 4}$$

The heat removed from the water first is applied for cooking or heating at heat exchanger 204. Heat is transferred from cooling water vapor to fuel coming from storage and hydrocarbons are converted into hydrogen and carbon monoxide by partial oxidation and by the reactions of the type given above in heat exchanger 243. In partial oxidation of hydrocarbons the following type of reaction occurs.

$$CxHy + 0.5XO_2 \rightarrow XCO + 0.5YH_2 + HEAT \qquad \text{Equation 5}$$

Heat released from the reaction of Equation 5 can be used to supplement heat needed to drive the reaction of Equations 1 and 2, particularly at times before sufficient heat is delivered through heat exchanger 243 by vapors from 204. The amount of heat delivered by the exothermic reaction of Equation 3 can be modulated by control of the amount of air added through solenoid operated valve 222 to meet the requirements as determined by electronic controller 234 as shown. Additional air is added through check valve 217 to assure complete combustion within heat exchanger 204. Pump 214 is preferably a diaphragm type pump that is driven by linear motor armature 216 that reciprocates under the attractive electromotive force of solenoid coil 220 and repulsive force of spring 218. Air entering pump 214 passes through filter 226 and check valve 224 to enter the chamber that is swept by cyclic closure of diaphragm 213 as shown. Check valve 217 assures flow from 214 into accumulator tube 215. Accumulator tube 215 is preferably large enough to provide substantially steady pressure to solenoid valve 222 which effectively operates as a pressure regulator for delivery to the primary side of heat-exchanger and reactor 243. Check valve 230 prevents entry of oxygen donors to tank 202.

Valve 245 allows fuel from 202 to be burned in air that enters burner tube 203 when collection of condensed water is not desired and/or when it is desired to add humidity to the area of invention operation by opening 246 for this purpose. Valve 245 provides fourway flows including flow of fuel from 243 to burner tube 204 or to burner tube 203 and air IBM flow into 203. Valve 246 allows exhaust to the surrounding atmosphere from 203 or 204. In instances that it is not preferred to collect water it is preferred to operate burner tube 203 as a hydrogen distributor and to burn hydrogen that exists from small orifices in open air to produce the heat needed. In this mode of operation, valve 245 simply routes hydrogen from 202 and 243 to 203.

A particularly useful embodiment for weight-saving applications such as back-packing is to utilize storage canister 202 with valve 245 and heat exchanger 208 to provide cooking and heating. In this application, hydrogen is the preferred fuel which is metered by valve 245 into combustion tube 203 with sufficient momentum to ingest air for oxidizing the hydrogen to form water vapor. Water vapor is condensed in 208 to provide heat for endothermic release of stored hydrogen. Water leaving 208 can be collected in 210 as shown. Opening valve 246 to vent a portion of the water vapor allows steaming or humidification functions by this embodiment.

Figure 14:
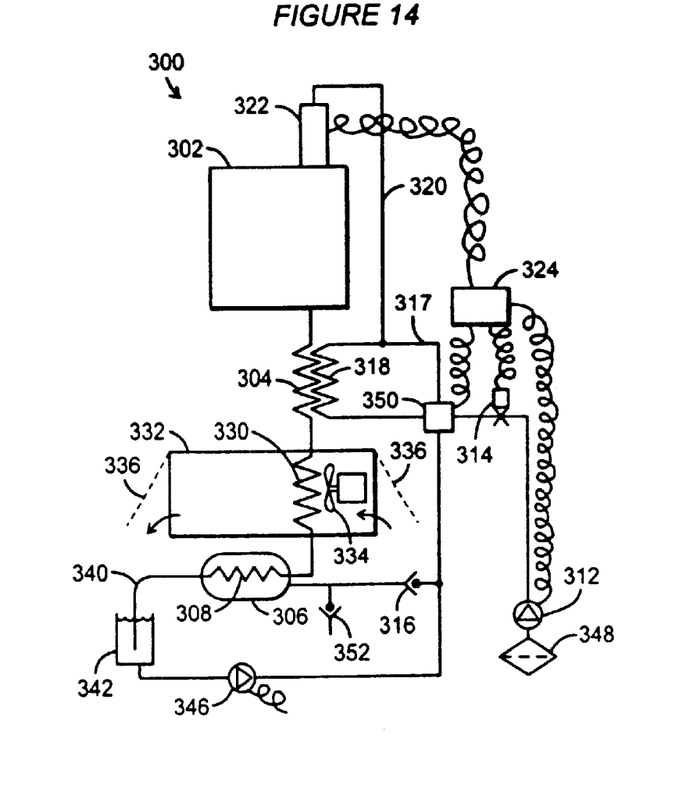
FIG. 14 is a schematic view of an embodiment for generating electricity and production of purified water.

FIG. 14 is a schematic view of an embodiment 300 for generating electricity, providing sensible heat for cooking, space heating, or other applications and production of purified water. In operation a thermoelectric device or heat engine 302 such as one operating on a Stirling, Brayton, Otto, or Diesel cycle powers a suitable linear or rotary generator. Exhaust gases from heat engine 302 are cooled in heat exchanger 304 as inventories of fuel ingredients such as a hydrocarbon and water are heated and reacted in heat exchanger 318 to form hydrogen and carbon monoxide according to the reactions selected from Equations 1, 2, and 5 to meet specific application conditions and needs. It should be noted that these generally refer to reactions in which a hydrogenous fuel constituent is reacted with an oxygen donor to form hydrogen and carbon monoxide. Equation 6 shows the case for various hydrocarbons in endothermic reactions with water as the oxygen donor.

$$CxHy + XH_2O + HEAT \rightarrow XCO + (X + 0.5Y)H_2 \qquad \text{Equation 6}$$

Exhaust gases are routed from heat exchanger 304 to heat exchanger 330 for purposes of heating food in an oven or cooktop provision. Oven 332 is preferably provided with a circulation fan 334 to enhance heat transfer to food in oven 332 and to provide space heating if oven doors 336 are opened as shown for circulation of room air through the unit to heat exchanger 330.

Exhaust gases are then routed to fuel storage heat exchangers such as 308 to provide endothermic heat for releasing fuel constituents stored in canister 306 which is constructed according to the principles of the invention. Released fuel constituents are delivered from storage in 306 by the tube shown to check valve 316 to be mixed with an oxygen donor such as water that is delivered by pump 346 or air by pump 312. Air is filtered by filter 348 as shown. Air can be used to provide exothermic conditions in reactor 318 at times that insufficient heat is available from 302 to operate 318 at desired rates. At times that water is chosen as an oxygen donor for endothermic reactions in 318, pump 346 may be operated in accordance with adaptive algorithms from controller 324 to supply 318 with water in proportion to the fuel delivered from 306.

Distilled quality water condensed in 308 or in delivery tube 340 is, delivered to water collector reservoir 342. Pump 346 can be operated by controller 324 to deliver water from 342 to 318 as needed. Solenoid valve 314 is actuated by controller 324 to proportion the oxygen donor(s) as required to provide efficient operation of heat exchanger 318 and to meet the fueling requirements of 302. Fuel constituents produced in 318 are delivered by tube 320 to the fuel metering system 322. If tank 306 is loaded with hydrogen it is preferred to by-pass heat exchanger 318 by opening four-way valve 350 to deliver from 316 to line 317 as shown.

Final metering and ignition of fuel by 322 for operation of the thermoelectric generator or engine 302 is preferably provided by my co-pending SmartPlug invention as disclosed in U.S. patent application Ser. No. 08/785,376. In instances that the SmartPlug is utilized for external combustion applications such as a thermoelectric generator or Stirling engine, it is preferable to operate the fuel delivery and combustion on a pulse combustion or an intermittent duty cycle to produce sound waves that enhance heat transfer. In instances that it is applied to an internal combustion engine such as a piston or Wankel type it is preferred to provide stratified charge fuel delivery and ignition operations as disclosed in the aforesaid pending patent application.

In operation, it is preferred to charge tank 306 through fueling port 352 with fuel at times that the supply system is relatively unused. This allows much better utilization of the natural gas delivery system. Tank 306 is typically sized to last several hours or days at normal usage. In camping, emergency support, and military applications it is preferred to charge the tank with hydrogen to maximize production of distilled quality water.

Suitable graphite crystals for such fuel storage components may be produced by carbon saturation of iron-carbon melts or other saturated solutions that precipitate graphite sheet material upon slow cooling or other changes of state.

Single crystals may be produced from coal or other carbon sources that are ground, cleaned, sized, mixed for dense compaction with or without addition of a suitable binder such as a hydrocarbon tar or phenolic resin, and pressed into the shape desired. Heating to 2,000 to 3,000° C. in a zone refining apparatus eventually produces a purified single crystal. Growing single crystal preforms is preferably undertaken by deposition of carbon from landfill methane, natural gas, or coal sources. Pyrolytic graphite is produced by dissociation of methane and other hydrocarbons at 1700° C. and higher temperatures at 25–150 mm Hg pressure:

$$CH_4 \rightarrow C + 2H_2 \quad \text{Equation 7}$$

The hydrogen produced by dissociation of hydrocarbons may be recovered for use as an engine fuel. U.S. patent application Ser. No. 08/785,376 discloses a particularly efficient method for burning hydrogen in internal combustion engines. It is preferred to burn hydrogen as engine fuel and to utilize the engine's shaft power to drive an electrical generator. Pyrolytic graphite is, therefore, produced by a natural gas or methane fueled cogeneration plant. On-site use of or sales of electricity are contemplated as important opportunities for reducing the cost of pyrolytic graphite. This is an important example of how to produce much greater value from existing fossil and waste hydrocarbons as it facilitates widespread applications of hydrogen and other renewable fuels to produce a wealth expansion economy as described in "Solar Hydrogen: Powering the New Millennium" pages 164–171, *The World & I* magazine, January 1999.

Pyrolytic graphite deposits may form a single crystal having the shape of the surface upon which it is grown. Basal planes (0001) are parallel to the surface of deposition. The hexagonal lattice interatomic distance is about 1.415 A and the distances between 0001 planes is about 3.4 A to 3.5 A rather than 3.35 as in natural graphite. This accounts for a slightly lower density, and lower electrical and thermal conductivities in the perpendicular direction than with natural graphite.

This greater distance between basal planes also assists in the exfoliation processes. Hydrogen, helium and other exfoliation gases are able to penetrate the pyrolytic graphite more easily. The Van der Waal bonding energy between basal planes is only about 1.3 to 1.6 Kcal/g-atom in natural graphite. Thus the basal planes of pyrolytic graphite are more easily forced apart during exfoliation. The bonding strengths in basal planes are virtually IST, equal in natural and pyrolytic graphite at 150–170 Kcal/g-atom.

Specialization of the basal planes can be accomplished by additions of interstitial atoms in the plane and between the laminate of graphene atoms, substantially out of the plane and between graphene atoms, and by substitution within the graphene crystals. Layers of basal planes can be modified to have customized surfactant, optical, specific heat, and a host of other effects and properties by addition of interstitial atoms that are selected by size and to be electron donors or electron acceptors. Similarly substitution of electron donor or electron acceptor atoms in place of carbon in the graphene crystal provides even more degrees of customization and can be used in conjunction with interstitial additions. This approach to customization works with BN and other exfoliable crystals. Suitable customized laminar crystalline material may be produced from designed materials including a hexagonal crystalline structure of the same atoms, a hexagonal crystalline structure of two or more kinds of atoms in stoichiometric proportions, a hexagonal crystalline structure of two or more kinds of atoms in non-stoichiometric proportions.

FIG. 8 illustrates an embodiment of the invention that utilizes the unusual physical properties of the basal planes to radially reinforce a pressure vessel while facilitating control of heat transfer processes. Pyrolytic graphite single crystals are grown or machined to desired shapes such as those shown in FIG. 1. A hole is bored through the center of each crystal to accommodate a suitable perforated tube or wire cloth central tube, 78.

The functions of the central tube are to hold the crystals in place during exfoliation, to provide longitudinal reinforcement to the composite tank assembly and to circulate gases through perforations 86 into and out of the layers of exfoliated graphite or boron nitride. After assembly of the central tube within the single crystals, fitting 84 is welded in place. The distance between flanges of fittings 82 and 84 is designed to allow the crystals to exfoliate to desired basal-plane spacings.

Exfoliation is accomplished by impregnation as noted above or loading the crystals and tube assembly into a chamber (not shown) with provisions for heating, changing atmosphere, and rapid vacuum treating. The assembly is hot soaked in an exfoliation gas such as hydrogen or helium and suddenly depressurized or vacuum shocked to cause exfoliation of the crystals. The assembly is then baked to remove residual exfoliation gas.

Outside "edge" surfaces of the exfoliated crystals 88 are then coated with a suitable high strength adhesive or diffusion braze formula and encased within a suitable low-permeability membrane 90. Exfoliated basal planes form a high strength radial reinforcement to the membrane. A very low-weight, high-strength structure results.

Adhesives suitable for the embodiment of FIG. 8 include: thermosets such as epoxies, phenol-formaldehyde, melamine-formaldehyde, silicones and addition-polyimides; including those containing siloxane; and thermoplastics such as aromatic polyesters, unsated polyesters, and poly-etherimides. The outside edges may also be coated for diffusion bonding of 88 to 90. Suitable membranes for 90 include wrapped, deep-drawn, or spin formed titanium, aluminum, stainless steels, and electro-formed nickel. Coatings include soldering, brazing, and diffusion bonding selections.

Composite membranes include metallized thin films of polyethylene terephthalate, ethylene chlorotrifluoroethylene, polyvinylidene fluoride, and polyolefins. The materials used for metallizing include iron, aluminum, titanium, chromium, nickel or sputtered alloys. The use of carbon deposits including those described in "Dual Ion Beam Deposition of Carbon Films with Diamond Like Properties" NASA TM-83743 (N31512/NSP), are contemplated as aids to the joining of basal planes 88 to membrane 90.

Basal planes of hexagonal boron nitride and pyrolytic graphite have high thermal conductivities. Joining the circumferential surfaces of exfoliated basal planes to an outside membrane that provides high heat transfer rates provides a method for controlling the heat exchange to and from fluids stored within the resulting structure. The highest heat transfer system for joining the basal planes to the outside membrane would be by diffusion bonding using suitable coatings to develop desired properties.

Controlled heat transfer is facilitated by incorporating an extended surface metal foil fin 92 over impermeable membrane 90. Corrugated fin 92 is covered by an insulative membrane 94 to produce a honeycomb of passageways 96 through which a heat transfer fluid may be circulated or stagnated for purposes of heat-transfer control. Suitable fluids for heat transfer include hydrogen, air, water, engine exhaust, and other heat transfer fluids. Materials suitable for membrane 94 include thermoplastics and thermo-setting compounds which may be reinforced or unreinforced.

In weight-sensitive applications it is contemplated to form corrugated fins 92 over the spherical ends of membrane 90 and to metallurgically bond the contact areas to membrane 90. Insulative membrane 94 may be a composite of a flexible polymer foam and a shrink tube of polyvinylidene fluoride. Heat transfer fluids such as hydrogen, helium, air, water, ethylene glycol and hydraulic oils are contemplated.

In transportation applications, filtered ambient-temperature air may be circulated through passageways 96 to remove heat from the exfoliated planes as fuel gases are loaded into storage as adsorbed monolayers and as "arrested" gases between monolayers. In this context, "arrested" means that gases have entered the space between the monolayers on exfoliated substrates, transferred energy to the substrates and as a result have reduced effective vapor pressures.

Figure 9:
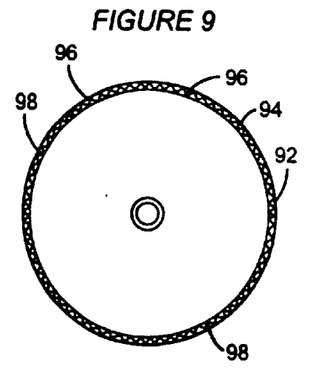
FIG. 9 is a sectional end view of the embodiment of the invention shown in FIG. 8.

In embodiments like the system of FIG. 8, desired reinforcement in the direction transverse to the radial reinforcement of the exfoliated planes may be accomplished by use of high-strength rovings or yarns or fibers applied over membrane 90. In instances that longitudinal corrugations such as the heat transfer fins 92 are employed, it is preferred to apply axial reinforcement rovings 98 over the corrugated surface of 92 as shown in FIG. 9. This allows the corrugated surface of 92 to serve as a load spreader against membrane 90 while avoiding interference with heat exchange between membrane 90 and fin 92.

Suitable high strength reinforcement yarns, and cables are made from boron, boron nitride, carbon, graphite, glass, silicon carbide, refractory metals, and ceramic fibers. Protection of axial yarns used for tank reinforcement is contemplated. Epoxy, polyamide varnishes and other popular adhesion and matrix resins are suitable as adhesive coatings on yarns and cables used as axial tank reinforcement systems.

In instances that basal plane separation distances exceeding those readily achieved by hydrogen or helium are desired, exfoliation with active and transition metals or fluids such as iodine and other halogens, phosphoric acid, zinc chloride, sulfuric acid, nitric acid, potassium sulfide, potassium chlorate, water, halocarbon refrigerants, and ammonia accomplish the desired spacing between laminate. Such exfoliation involves impregnation of the space between the basal planes with a fluid, heating to temperatures between 400 and 1,800° C. with or without the aid of a vacuum, to cause sudden vaporization and expansion of the fluid to force further separation of the basal planes. Following expansion, the exfoliated graphite may be compacted in the direction that reduces the spacing between the graphene laminate to the desired magnitude to customize storage and strength characteristics. Spacings of various ranges such as 5–15 Å, 15–50 Å, 50–360 Å, and greater than 360 Å provide familial groupings for the customized properties that result.

Therefore considerable weight reduction is potentially offered by the use of a thin membrane 90 supported radially by basal planes of exfoliated media and axially by high strength fibers. Pressure vessel walls can generally be reduced to about ½ the thickness of designs without the reinforcing systems of the present invention. Anchoring axial fibers to flanges 8 on the ends of tube 78 are contemplated along with wrapping and securing axial fibers around the neck of tube 78.

Further weight savings are produced by separation of the exfoliated basal planes to distances in the order of 350 Å or more depending upon desired properties and characteristics. This reduces the exfoliated crystal bulk density of pyrolytic graphite or boron nitride from 2.26 grams per cubic centimeter to 0.02 grams per cubic centimeter or less. A tank 20 cm in diameter and 120 cm long with spherical ends could have about 700 grams of radial reinforcement disks on 360 Å centers; diffusion bonded titanium skin, 0.025 centimeters thick, having a mass of 480 grams; axial reinforcement of graphite yearn having a mass of 800 grams; and offer a burst pressure of over 40.2 MPa (6,000 PSI). The total tank would have a mass of about 2,300 grams and deliver more than 35,000 cubic centimeters of fluids. This shows the great advantage in utilizing the interior plates in tensile load bearing strengthening of the containment membrane.

The same reinforcement principles of my invention's previous example allow a tank with an assembled mass of less than 16,000 grams to safely withstand gas storage pressures of more than 335 Mpa (50,000 PSI) which allows gases such as hydrogen or methane to be quickly loaded and stored at gasoline energy density. This enables quick loading to very high energy storage densities followed by heat transfer out of the basal planes as the pressure is reduced to nominal values.

Planar walls 88 provide light-weight strength reinforcement to the containment membrane 90 that surrounds the expanded layers of planar walls. Central tensile strength member 78 is utilized to impart strength in the direction orthoginal to the direction of strengthening by planar walls 88 to provide an extremely robust tank assembly for withstanding the forces produced by: rapid fluid-loading pressure, inertia loading, fluid unloading pressure, and external forces applied to said system. Further strengthening is provided by 92 which also provides circulation of heat exchange fluids to facilitate rapid heat transfer for loading and unloading the system.

Another embodiment 100 of the invention is shown in FIG. 10. Although it may be constructed in nearly any desired shape it is preferably spherical as shown. Shaped single crystals of graphite or boron nitride are used as precursors to create reinforcement disks 102. These disks are diffusion bonded to a thin membrane 104. Membrane 104 is reinforced on the outside surface by high strength films 106 which provide good protection against fire impingement and point loading. Flow into and out of the storage vessel is through perforated tube 108 which is hermetically bonded to membrane 104. Tube 108 may be terminated as desired with fittings and flanges 112 for mounting purposes.

Single crystals of graphite or boron nitride are prepared in the desired shapes by pyrolytic growth or by machining techniques. A hole is bored to accommodate perforated tube 108. The assembly is loaded on appropriate tooling fixtures in an exfoliation furnace. A primary exfoliation gas such as hydrogen is diffused into the single crystals. Upon sudden depressurization, the single crystals are exfoliated. A secondary exfoliation fluid such as C $Cl_2F_2$, $CCl_3F$, $CHClF_2$, $CClF_2C$ $ClF_2$, or $Ccl_2F$ $Cclf_2$ is used to pressure saturate the exfoliated layers and then to further separate the exfoliated layers upon sudden pressure release.

Fully exfoliated single crystals are encased within a thin-walled membrane 104. Suitable materials for membrane 104 include spinformed aluminum, titanium, and deposited polymers such as polyvinylidene chloride, polyvinylidene fluoride, and ethylene chlorotrifluoroethylene. The polymer membranes may be metallized with vapor deposited aluminum to produce an impermeable composite membrane.

High-strength exterior coatings are contemplated to provide reinforcement and scratch protection. Numerous processes have been published including U.S. Pat. No. 4,490,229, deposition by partial oxidation, and various sputtering techniques for providing diamond-like properties from deposited carbon films. Such diamond-like coatings including deposits of carbon, boron, boron carbide ($B_4C$), boron nitride (BN), silicon carbide (SiC), titanium boride ($TiB_2$) and refractory metal carbides may be deposited to form films with very high tensile strengths. Methods for making such deposits include radio frequency, plasma, and ion beam techniques and by vapor chemical depositions.

In the instance of diamond-like carbon deposition by high frequency multiple ion sources, the deposition is chemically inert, about as hard and strong as diamond, and clear with an index of refraction of about 3.2. Deposits 2 or 4 microns in thickness provide substantial reinforcement without causing point loading or stress-risers. Scratch and abrasion resistance approach that of diamond.

Figure 12:
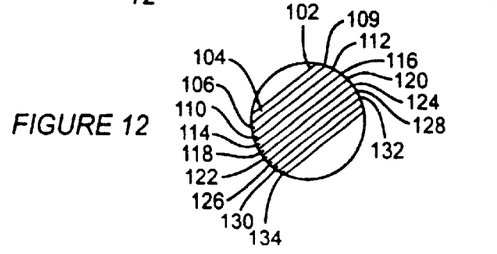
FIG. 12 is a magnified view of a portion of the embodiment of FIG. 10.

Several layers of thin coatings of highly different properties are contemplated including the use of alternating metallic and transparent dielectric layers to produce very high thermal isolation capabilities. Applications of the concepts of FIGS. 8 and 10 as cryogenic liquid storage vessels are contemplated. Inlet and outlet tube 108 is constructed to control heat exchange and membrane 104 is polished to a very high reflectance, coated with transparent diamond-like carbon 106 to a thickness of several thousand angstroms, and the assembly is alternately coated with additional layers of high reflectivity materials 109, 112, 116, 120, 124, 128, 132 etc., each of which is isolated by highly transparent dielectric layers 104, 106, 110, 114, 118, 122, 126, 130, 134 etc., as shown in FIG. 12.

Heat exchange could be characterized by 5 to 10 layers of 98% or higher reflectance values. The protective inner layers of dielectric amorphous carbon would prevent oxidation or tarnishing while providing diamond-like tensile strength to reinforce membrane 104. Thermal isolation of vessel 100 is expected to be equal to the best vacuum thermos technology while burst strengths and payloads are much higher than the best pressure vessels because of the diamond-like strength of reinforcement disks 104 and layers 106 . . . 134.

Controlled removal and addition of heat provides new horizons for safe storage, transportation, and application of gases that are essential to the progress of the Industrial Revolution. Characteristics and applications of the heat control system include the following:

1. The rate of heat release during gas loading can provide a thermal source for certain applications.
2. After the host crystals are loaded with stored molecules it is possible to puncture the canister without rapid escape of the stored gas. Stored molecules will be returned to gaseous state and released only upon stimulation such as sonic excitement, heat addition, or electrically charging the host crystals. The controlled rate of heat or charge addition determines the rate of release of stored molecules.

The present parallel laminate storage technology is especially useful for receiving cryogenic liquids such as methane, nitrogen, oxygen, or hydrogen which heat sink the energy of the adsorption process as the fluid goes into storage. This provides quick storage of cold liquids and release of the gas at the desired time and pressure after the system reaches ambient temperature. Illustratively, this facilitates efficient trans-continental and trans-oceanic shipments of cryogenic liquefied gases and quick distribution to transportation vehicles and other smaller quantity requirements.

An attendant revelation of my dense storage invention concerns the storage of diatomic molecules such as hydrogen. The prevalent isotope of hydrogen has a mass of 1 and is the simplest atom consisting of one proton and one electron. Hydrogen molecules consist of two atoms and exist in two isomeric forms, orthohydrogen and parahydrogen. In orthohydrogen the two atomic nuclei are spinning in the same direction (parallel spin) while in parahydrogen the two nuclear spins are in opposite (antiparallel) directions. At and above ambient temperature the equilibrium composition is about 75% orthohydrogen. As hydrogen is cooled, the equilibrium shifts towards increased parahydrogen. At liquid nitrogen temperature (77.4° K.), about 52% orthohydrogen would exist at equilibrium. At the boiling point of hydrogen (20.4° K.), the equilibrium composition is 99.8% parahydrogen. Because equilibrium takes time to develop it is possible to liquify hydrogen with about 75% or more orthohydrogen present.

Orthohydrogen quickly cooled to liquid state will slowly change to the parahydrogen isomer in an exothermic process. The exothermic process releases about 168 cal/g and will cause considerable evaporation of the liquid hydrogen even if it is perfectly isolated from all external heat sources. In order to prepare hydrogen as a cryogenic substance it is more efficient to convert the orthohydrogen to parahydrogen before liquefaction or solidification.

Certain catalysts including hydrated ferric oxide gel, ruthenium, and nickel silicate are effective in promoting equilibrium conditions by converting orthohydrogen to parahydrogen. When long-term storage of arrested hydrogen according to the teachings of this invention is desired, these catalysts may be used in conjunction with host crystal beds to assure that predominantly parahydrogen enters storage. It is therefore preferred to use diatomic hydrogen that has been through cryogenic conditioning or to catalytically process hydrogen with hydrated ferric oxide gel, ruthenium, and nickel silicate or similar catalysts to produce parahydrogen for storage in the crystal matrix systems disclosed.

In the instance that cryogenic storage or cryogenic conditioning is chosen it is preferred to load a receiver vessel such as the embodiment of FIGS. 1, 3, 6, 8, and 10 with liquified diatomic fluids. The cold liquid provides a heat sink for exothermic adsorption processes and allows extremely rapid loading without substantial external heat removal. It is usually desired to rapidly load such fluids into storage and more gradually remove gases from such storage and this embodiment of the invention facilitates this needed expedience. This embodiment facilitates quick distribution of liquid hydrogen and/or methane such as from bulk deliveries by transoceanic tankers, barges, rail cars, and trucks by providing for safe and rapid transfers to transportation vehicles, recreational apparatus, and agricultural implements.

SUMMARY, RAMIFICATIONS, AND SCOPE

Ordinarily, hydrogen is about 14 times less dense than air and poses a seemingly impossible case for storage at the energy density of gasoline. My invention enables alternative fuels such as hydrogen, natural gas, and/or landfill methane to be stored at energy densities of gasoline as multiple layers in relatively motion-arrested status between a multitude of expansive, parallel, walls that may be as thin as one-atom. This compact storage system for fluids is provided by multitudes of closely spaced parallel planes of adsorptive material 88 that is contained within a substantially impervious barrier membrane 2. In normal pressure-containing embodiments, reinforcement 4 is wrapped upon the impervious barrier layer 2 to increase the burst strength of the assembly that results. In extreme pressure containing embodiments and/or where it is important to maximize the ratio of energy density per mass unit of storage system, material 88 provides internal reinforcement of barrier layer 2. Rapid gas addition and removal from storage are facilitated by extremely high heat exchange rates through 88 to membrane 2 and/or structure 92 which facilitates high or low heat transfer rates as needed. My invention's heatexchange method is extremely rugged and simplified compared to past approaches of interruptive plumbing through the adsorption system with a network of heat-exchanger tubing.

It thus will be understood that the objects of my invention have been fully and effectively accomplished. Therefore, this invention includes all modifications encompassed within the spirit and scope of the following claims and their legal equivalence, rather than by the examples given.

What is claimed is:

1. A gas storage system comprising:
   a container containing parallel layers of exfoliated laminar material and a gas, wherein an electric charge is produced on particles of said gas and/or on said laminar material and wherein said gas is densified and adsorbed on said laminar material for compact storage of said gas.

2. A gas storage system as in claim 1 wherein said laminar material is selected from the group comprised of a hexagonal crystalline structure of the same atoms, a hexagonal crystalline structure of two or more kinds of atoms in stoichiometric proportions, a hexagonal crystalline structure of two or more kinds of atoms in non-stoichiometric proportions.

3. A gas storage system as in claim 1 wherein said laminar material comprises graphite or boron nitride.

4. A gas storage system as in claim 1 wherein said laminar material comprises a graphite selected from the group comprised of pyrolytic graphite, graphite precipitated from molten metal, graphite precipitated from saturated solution, and graphite agglomerated from smaller particles.

5. A gas storage system as in claim 1 wherein substantial proportions of said material are separated by substantially the same separation distance.

6. A gas storage system as in claim 1 wherein proportions of said material are separated by assorted separation distances.

7. A gas storage system as in claim 1 wherein said charge is applied at the time of adding said particles to said storage system.

8. A gas storage system as in claim 1 wherein said charge is selected from the group comprised of a positive charge on particles of said gas, a negative charge on particles of said gas, a positive charge on layers of said material, and a negative charge-on layers of said material.

9. A gas storage system as in claim 1 wherein said laminar material is contained within a container comprising a substantially impermeable barrier membrane.

10. A gas storage system as in claim 1 wherein said laminar material is contained within a container comprising a substantially impermeable barrier membrane and said impermeable barrier membranes is coated with reinforcing material.

11. A gas storage system as in claim 1 wherein said laminar material is contained within a container comprising a substantially impermeable barrier membrane and said impermeable barrier membrane is built upon with material systems selected from the group comprised of reinforcing material, alternate layers of high reflectivity material and layers of transparent material having low thermal conductivity in a direction perpendicular to said layers, material incorporating channels for circulation of heat exchange fluid, and insulative foam.

12. A gas storage system as in claim 1 wherein said laminar material is positioned to include a central support.

13. A gas storage system as in claim 1 wherein said laminar material is positioned around a central support and said laminar material is contained within a container comprising a substantially impermeable barrier membrane and wherein said laminate extend radially between said central support and said impermeable barrier membrane.

14. A gas storage system as in claim 1 wherein said laminar material is positioned around a central support and said laminar material is contained within a container comprising a substantially impermeable barrier membrane and wherein said laminate extend radially between said central support and said impermeable barrier membrane and wherein said laminate are affixed to said impermeable barrier membrane.

15. A gas storage system as in claim 1 wherein said laminar material is positioned around a central support and said laminar material is contained within a container comprising a substantially impermeable barrier membrane and wherein said laminate extend radially between said central support and said impermeable barrier membrane and wherein said laminate are affixed to said impermeable barrier membrane and wherein said central support imparts containment strength to said impermeable barrier membrane.

16. A gas storage system as in claim 1 in which a heat transfer means is provided by selection from the group comprised of heat supplied to said laminate, heat removed from said laminate, heat intermittently supplied to said laminate, and heat intermittently removed from said laminate.

17. A gas storage system as in claim 1 in which said electric charge is applied according to the group comprised of continuous application of said charge, intermittent application of said charge, application of reversed charge, and neutralization of said charge.

18. A gas storage system as in claim 1 in which an energy exchange means is provided from the group comprised of addition of vibrational energy to said laminate, removal of vibrational energy from said laminate, intermittent application of vibrational energy, addition of radiant energy, removal of radiant energy and intermittent application of radiant energy.

19. A gas storage system as in claim 18 in which said energy exchange means is utilized for controlling the rate of gas release from said storage system.

20. A gas storage system as in claim 18 in which said energy exchange means is utilized for controlling the rate of gas loading to said. storage system.

\* \* \* \* \*